US005761056A

United States Patent [19]

Noh

[11] Patent Number: 5,761,056

[45] Date of Patent: Jun. 2, 1998

[54] CIRCUIT FOR PROTECTING FLUORESCENT LAMP FROM OVERLOAD

[75] Inventor: Shi Youl Noh, Seoul, Rep. of Korea

[73] Assignee: Boam R & D Co., Ltd., Kyonggi-do, Rep. of Korea

[21] Appl. No.: 801,403

[22] Filed: Feb. 20, 1997

[51] Int. Cl.$^{6}$ .......................... H02M 7/5387; G05F 1/00; H05B 41/36

[52] U.S. Cl. .................... 363/132; 315/307; 315/DIG. 7; 315/DIG. 5

[58] Field of Search .................................... 315/291, 293, 315/240, 307, DIG. 5, DIG. 7; 363/132

[56] References Cited

U.S. PATENT DOCUMENTS 5,585,699 12/1996 Schulz .................................... 315/293

*Primary Examiner*—Peter S. Wong
*Assistant Examiner*—Rajnikant B. Patel
*Attorney, Agent, or Firm*—Jacobson, Price, Holman & Stern, PLLC

[57] ABSTRACT

A circuit for protecting a fluorescent lamp from overload is disclosed, including a pulse voltage generator for generating a pulse voltage from a smoothed DC; a driver for accepting the pulse voltage from the pulse voltage generator, to drive the circuit; and an overpower prevention portion for preventing the fluorescent lamp from receiving overpower when the circuit is driven by the driver.

1 Claim, 3 Drawing Sheets

CIRCUIT FOR PROTECTING FLUORESCENT LAMP FROM OVERLOAD

BACKGROUND OF THE INVENTION

1. Field of the Invention

The present invention relates to a circuit for protecting a fluorescent lamp from overload and, more particularly, to a circuit for protecting an electronic ballast and filament of a fluorescent lamp from overload, to thereby prevent their service lifetime from being shorten.

2. Discussion of Related Art

With a fluorescent lamp, ultraviolet ray is obtained using discharge which is generated when a higher voltage is applied between both electrodes (filaments) of the lamp, and the ultraviolet ray reacts with a fluorescent material on the inner wall of the lamp, to thereby emit light. The discharge of the filament requires a higher voltage at the initial stage. As this higher voltage, a voltage is used, which is generated from a ballast when current through the ballast is suddenly cut off. When the filament is discharged, discharge current flows in the lamp so as to lower the resistance of the lamp. After this, the discharge can be maintained with a lower voltage. The ballast protects the lamp from overcurrent.

FIG. 1 shows a conventional fluorescent lamp circuit in mechanical switching mode. This circuit can be used at a frequency of power system for home use, 50 to 60 Hz. However, its efficiency is lower, and the volume and weight of its ballast are larger. Moreover, it cannot be used for a fluorescent lamp employing an electronic ballast using a higher frequency with a higher efficiency.

FIG. 2 shows a conventional fluorescent lamp circuit in electronic switching mode. This circuit has life time longer than that of the mechanical-switching-mode fluorescent lamp circuit. However, its operation is identical to that of the circuit in mechanical switching mode. Thus, the fluorescent lamp circuit in electronic switching mode has the same problems as that of the circuit in mechanical switching mode.

In case that a ballast is used, which is formed in such a manner that a coil is coiled around a core, instead of the electronic ballast, the circuit can be used at a frequency of power system for home use. However, its efficiency is lower, and the volume and weight of its ballast are larger. To overcome the aforementioned shortcomings, circuits employing electronic ballast shown in FIGS. 3 and 4 have been proposed. FIG. 3 shows a conventional fluorescent lamp circuit using a condenser. Since this circuit uses the condenser, the number of circuit parts is smaller, and the circuit has small heat loss. However, the preheating time of its filament is short.

Furthermore, it is difficult to control the load applied to the lamp according to the characteristic of the lamp because the condenser is fixed. This reduces the life of the lamp.

FIG. 4 shows a conventional fluorescent lamp circuit using a thermistor. This circuit solves the problems of the circuit of FIG. 3 using the thermistor. However, the thermistor for controlling the load applied to the lamp is relatively expensive, and the lamp changeover is impossible because the lamp is fixed to the circuit.

SUMMARY OF THE INVENTION

Accordingly, the present invention is directed to a circuit for protecting a fluorescent lamp from overload that substantially obviates one or more of the problems due to limitations and disadvantages of the related art.

An object of the present invention is to provide a circuit for protecting a fluorescent lamp from overload, which protects the lamp's filament from overload applied thereto, prevents its ballast from being destructed due to its overheat when the filament is cut, and allows the lamp to be replaced when the lamp has served its time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a circuit for protecting a fluorescent lamp from overload, includes a pulse voltage generator for generating a pulse voltage from a smoothed DC; a driver for accepting the pulse voltage from the pulse voltage generator, to drive the circuit; and an overpower prevention portion for preventing the fluorescent lamp from receiving overpower when the circuit is driven by the driver.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
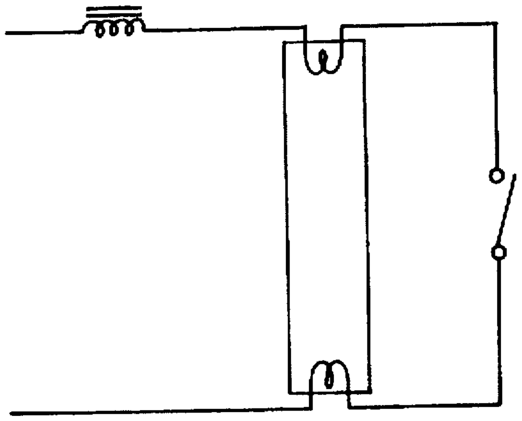
FIG. 1 is a schematic circuit diagram of a conventional fluorescent lamp in a mechanical switching mode.
Figure 2:
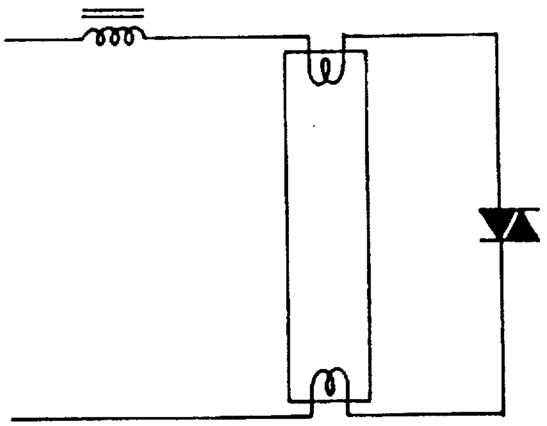
FIG. 2 is a schematic circuit diagram of a conventional fluorescent lamp in an electronic switching mode.
Figure 3:
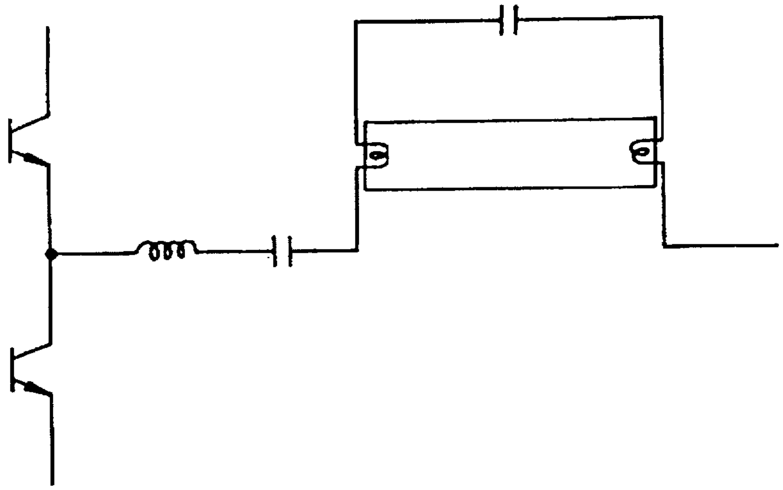
FIG. 3 is a schematic circuit diagram of a conventional fluorescent lamp using a condenser.
Figure 4:
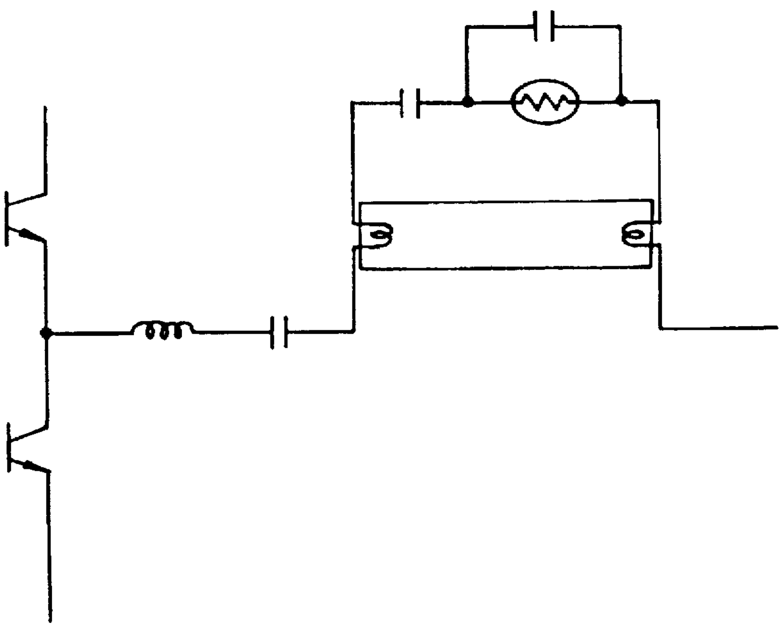
FIG. 4 is a schematic circuit diagram of a conventional fluorescent lamp using a thermistor.
Figure 5:
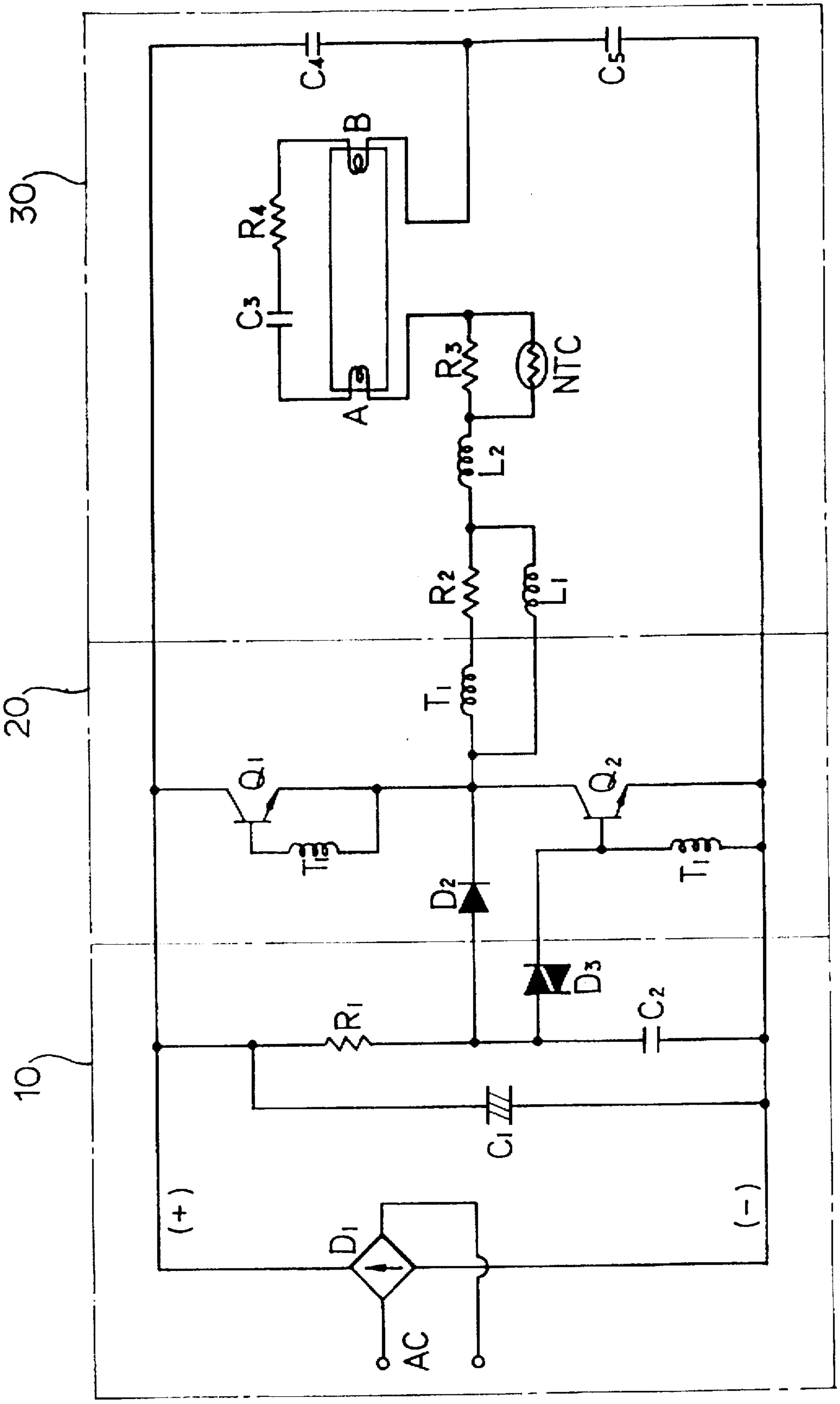
FIG. 5 is a schematic circuit diagram of a fluorescent lamp according to the present invention.

FIG. 5 is a schematic circuit diagram of a fluorescent lamp according to the present invention. Referring to FIG. 5, the lamp includes a pulse voltage generator 10 for generating a pulse voltage from a smoothed DC applied thereto, a driver 20 for accepting the pulse voltage from pulse voltage generator 10 to drive the circuit, and an overpower prevention portion 30 for preventing the circuit from receiving overpower when the circuit is driven by driver 20. The operation of the circuit will be explained below in detail.

In pulse voltage generator 10, an AC applied to the input of the circuit is converted into a rectified DC through a balanced bridge D1, the rectified DC is smoothed by an electrolytic condenser C1 connected to balanced bridge D1 in parallel, and the smoothed DC is charged in a capacitor C2 connected to electrolytic condenser C1 in parallel through a first resistor R1. The charged current passes through a diode D2, and may reach a first transistor Q1 and second transistor Q2. However, the current cannot pass through the transistors when the base of each transistor is not turned on.

The current which passes through diode D2 may reach the lamp's filament of the lamp through an oscillation transformer T1, first inductor L1, second resistor R2 and second inductor L2. However, the current is cut off by a capacitor C3 because it is DC. When the current is charged in capacitor C2 above a predetermined amount, a pulse voltage is generated by a DIAC D3, and the pulse voltage is applied to the base of second transistor Q2 so as to turn on second transistor Q2.

When transistor Q2 is turned on, the current flows emitter E of transistor Q2 through diode D2, and a reverse voltage opposite to the direction of the current is applied to capacitor C2. By doing so, DIAC D3 is turned off. If transistor Q2 is turned on, and the current flows from its collector C to its emitter E, induction current is induced in oscillation transformer T1. When the current reaches a predetermined level, the base of transistor Q2 is turned off so as to stop the current from flowing. Then, the induction current induced in oscillation transformer T1 is sent to the base of transistor Q1, and this current turns on the base. By doing so, the current flows from collector C of transistor Q1 to its emitter E, driving transistor Q1. When transistor Q1 is driven, induction current is generated in oscillation transformer T1, and this induction current drives transistor Q2. As described above, transistors Q1 and Q2 are periodically ON/OFF so as to generate a frequency.

A load is applied to a fluorescent lamp 35 due to the frequency generated from the periodic ON/OFF operation of transistors Q1 and Q2. The period of the frequency depends on the characteristic of transistors Q1 and Q2, inductance of oscillation transformer T1, and characteristic value of lamp, capacitors C3, C4 and C5. When lamp 35 is initially turned on, the electronic ballast may be destructed due to the AC applied to its filament. Furthermore, when the filament is preheated, overload is applied to it before it is heated. This reduces the lifetime of the lamp. This will be explained below in detail.

Since the initial frequency generated by the ON/OFF operation of transistors Q1 and Q2 depends on the characteristic of transistors Q1 and Q2, inductance of oscillation transformer T1, and characteristic value of lamp, capacitors C3, C4 and C5, it is higher than the frequency during the normal operation by 1.5 to three times. Due to this high frequency, high-frequency resistance of inductor L2 is increased, and the loss of capacitor C3 becomes lower. By doing so, overcurrent is applied to the filament before it is heated, reducing the life of filament and ballast.

In order to solve this problem, inductor L1 is connected to oscillation transformer T1 in parallel, resistor R3 and thermistor NTC connected to each other in parallel are connected between filament A and inductor L2, and resistor R2 is connected between oscillation transformer T1 and inductor L2. Resistor R2 makes the setting up of inductor Li value easier. How inductor L1 prevents the life of electronic ballast and filament from being shorten will be explained below.

When oscillation transformer T1 is operated, transistors Q1 and Q2 are repeatedly turned of/off according to the power applied to the coil connected to the output of transformer T1 in series. The power and impedance applied to the coil determines a frequency which is applied to the filament of the fluorescent lamp. That is, if the impedance is higher, a lower frequency is obtained. On the other hand, when the impedance is lower, a higher frequency is formed. However, only oscillation transformer T1 cannot make the frequency meet the power condition needed to the circuit. Thus, inductor L1 is connected to transformer T1 in parallel. By doing so, the frequency can be converted to correspond to the power condition.

When a power is applied to transformer T1 and inductor L1, since the size of inductor L1 is smaller than that of transformer T1, current higher than the inherent inductance value of inductor L1 flows through inductor L1. Accordingly, inductor L1 loses its inherent inductance, that is, it is in saturation, producing an impedance value lower than the inherent value. As a result, since current which will flow through transformer T1 flows through inductor L1 having a lower inductance, the inherent inductance of transformer T1 does not work. If the inherent inductance of inductor L1 is decreased, the inductance of oscillation transformer T1 connected thereto in parallel is also decreased due to mutual interference between them.

According to the aforementioned operation principle, in case that a higher frequency initially applies a load higher than a reference value to the filament, the mutual interference inductance reduction is accomplished due to inductor L1. This increases the frequency, the increased frequency applies an appropriate amount of load to filaments A and B, and resistor R4, and initial power loss is completed. As a result, it is possible to remove overload applied to the filament when it is preheated, and to extend the filament life.

The above-described mutual interference inductance reduction protects a lamp from overload even in case that the lamp has a filament to which overload above a predetermined level is applied due to the aging of lamp. That is, when overcurrent flows through the filament due to the aging of lamp, inductor L1 loses the inherent inductance and its inductance becomes lower. Thus, current flows through inductor L1 rather than oscillation transformer T1, so that transmitter T1 loses its inherent inductance. This mutual interference inductance reduction increases the frequency, and the increased frequency lower then the load applied to the filament. Accordingly, the filament can be protected from overload due to the aging of filament. Even in case that an old lamp is replaced with new one, the mutual interference inductance reduction operates the fluorescent lamp circuit.

When inductor L1 is connected to oscillation transformer T1 in parallel for the purpose of preventing the lamp from receiving overload, it is difficult to set up the inductance of inductor L1 in proportion to the inductance of transformer T1. For solving this problem, resistor R2 is connected to transformer T1 in series.

Meantime, in overpower prevention portion 30, resistor R3 and thermistor NTC are connected to each other in parallel, and these are connected between filament A and inductor L2 in series, to thereby protect the ballast from being destructed when overload breaks the filament. This will be explained below in detail. When the lamp is initially turned on, AC flows through inductor L2, and is then divided at resistor R3 and thermistor NTC connected thereto. Thermistor NTC has a higher resistance due to its own characteristic because it is not preheated by the current yet, and resistor R3 also has a higher resistance. Thus, a higher voltage is generated at the portion where resistor R3 and thermistor NTC are connected even if they are connected to each other in parallel.

The filament, resistor R3 and thermistor NTC divide the voltage, so that a voltage lower than a voltage needed for the discharge is induced to the filament. By doing so, the filament is not discharged, but it can be initially preheated, protecting the filament from overvoltage generated during the discharge. Then, if thermistor NTC is heated by the current, its resistance becomes lower depending on its own characteristic. This reduces the voltage at the portion where resistor R3 and thermistor NTC are connected to each other, and thus the voltage of the filament is increased. As a result, the voltage needed for the discharge is obtained, and the discharge starts.

When a lamp filament is broken, intermittent discharge may occur at the broken filament, destructing an electronic ballast of the lamp. If the circuit of the present invention is applied to this case, the combination resistance of resistor R3 and thermistor T1 is increased, and the lamp circuit has lower power loss. Thus, the ballast can be protected from destruction.

According to the present invention, oscillation transformer T1 and inductor L1 of the fluorescent lamp are connected to each other in parallel so as to control the load applied to the lamp using the inductance reduction of inductor L1. This protects the lamp filament from overload before the filament is heated, preventing the filament life being shorten. Furthermore, the filament can be protected from overload in case that overload is applied to the filament due to the aging of the lamp. When an old lamp is replaced by new one, the fluorescent lamp circuit of the present invention is operated in response to the new one. Thus, it is possible to replace the lamp from the circuit.

Moreover, resistor R3 and thermistor NTC are connected to each other in parallel, and they are connected to the filament and inductor L2, to thereby prevent the filament from receiving overload. Also, the electronic ballast is protected from being destructed due to intermittent discharge which is generated when the filament is broken.

It will be apparent to those skilled in the art that various modifications and variations can be made in the circuit for protecting a fluorescent lamp from overload of the present invention without departing from the spirit or scope of the invention. Thus, it is intended that the present invention cover the modifications and variations of this invention provided they come within the scope of the appended claims and their equivalents.

What is claimed is:

1. A circuit for protecting a fluorescent lamp from overload, comprising:

a pulse voltage generator having a capacitor and a diac for generating a pulse voltage converted from a DC voltage applied to the capacitor;

a pair of transistors connected in series, each transistor being turned on and off responding to induction current from an oscillation transformer connected to the pulse voltage generator to generate a frequency;

a driver circuit having the oscillation transformer connected to a base of each of said transistors;

a first inductor connected to the oscillation transformer in parallel for reducing the overload by mutual interference with the oscillation transformer;

a first resistor connected to the first inductor in parallel for making a preset value of the first inductor stable;

a second inductor connected to the first resistor in series for reducing the overload by mutual interference with the first inductor;

a second resistor connected to the second inductor in series; and a thermistor connected to the second resistor in parallel and connected to a filament in series for compensation the overload exceeding the preset value applied to the filament.

* * * * *